June 3, 1958  G. C. MAYFIELD  2,837,385
PISTON RING ELEMENT AND METHOD OF MAKING SAME
Filed Aug. 8, 1956  3 Sheets-Sheet 1

INVENTOR:
GEORGE C. MAYFIELD
BY
ATTORNEYS

June 3, 1958  G. C. MAYFIELD  2,837,385
PISTON RING ELEMENT AND METHOD OF MAKING SAME
Filed Aug. 8, 1956  3 Sheets-Sheet 2

INVENTOR:
GEORGE C. MAYFIELD
By Brumbaugh and Sutherland
ATTORNEYS.

United States Patent Office 2,837,385
Patented June 3, 1958

2,837,385

PISTON RING ELEMENT AND METHOD OF MAKING SAME

George C. Mayfield, Richmond Heights, Mo., assignor to McQuay-Norris Manufacturing Company, St. Louis, Mo., a corporation of Delaware Application August 8, 1956, Serial No. 602,736

12 Claims. (Cl. 309—44)

This invention relates generally to piston rings, and particularly to rings of the character having one or more cylinder-engaging rails which are urged radially outward by a non-bottoming expander which may also serve as a spacer between a pair of such rails.

Non-bottoming piston rings and expanders for piston rings have long been proposed. Such rings are characterized by the feature that their ends abut when in operative position in a cylinder so that the ring is said to be circumferentially compressible, as distinguished from the familiar C-type ring wherein the ring is compressible to reduce its diameter by bending the free ends thereof radially inward.

In my prior United States Patent No. 2,486,359, there is disclosed a non-bottoming type of piston ring which is characterized by the feature that one of the peripheral edges is circumferentially continuous, i. e., uninterrupted by incisions except at the ends which abut, and the circumferential compressibility is accomplished by the provision at the continuous periphery of a series of flexible bridges in alignment with slots or incisions which are open at the opposite periphery.

It is the object of the present invention, generally stated, to modify and adapt the piston ring disclosed in my patent aforesaid so that the advantages thereof may be availed of as an expander in connection with piston rings of the character having one or more cylinder-engaging rails.

In accordance with the present invention, the circumferentially compressible piston ring disclosed in my aforesaid patent is provided with means for transmitting thrust in the radial direction to an associated cylinder-engaging rail. In accordance with one embodiment of the invention, integral tabs are turned up from the ring shown in said patent so as to engage the inner periphery of the upper cylinder-engaging rail; and likewise, similar tabs are turned downwardly so as to engage the inner periphery of the lower cylinder-engaging rail; but it will be understood that other appropriate means of transmitting thrust radially from one of the members to the other may be utilized. In accordance with another embodiment of the invention, the flexible webs at the continuous periphery are preformed to provide abutments against which the inner periphery of the cylinder-engaging rails may seat and receive thrust from the expander; and may be elongated to make possible the achievement of a substantially greater degree of circumferential compressibility—i. e., a greater finite difference between the fully compressed and the fully expanded circumference than is possible with the precise structure disclosed in the aforesaid patent. When so elongated, the additional material of the fold may be conveniently accommodated between the lands of the channel-shaped ring, and if desired may be folded therein to engage the land opposite that in which a fold is rooted, thereby providing a series of spacer elements adjacent the free edges of the channel-shaped spacer-expander.

Referring now to the drawings, in which.

The piston ring assembly of the present invention consists essentially of one or more cylinder-engaging rails 1 and 2 of a character well known in the art, and formed usually of strip steel wound into an annulus with the thin dimension of the strip extending in the axial direction of the annulus. Such rings are provided with a gap 3 between the ends thereof. To maintain such cylinder-engaging rails in properly spaced relationship and to urge the same radially outward into firm engagement with the cylinder walls, a spacer-expander is conventionally employed.

Figure 1:
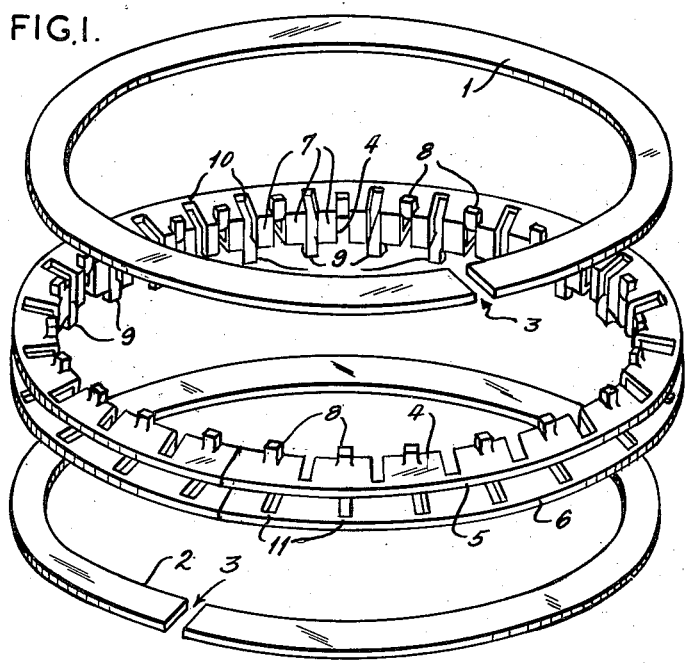
Figure 1 is an exploded perspective view of a piston ring assembly constructed in accordance with one embodiment of the present invention.
Figure 2:
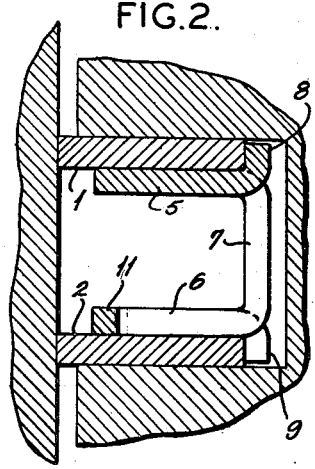
Figure 2 is a sectional view taken radially of a typical cylinder-piston assembly and showing the several components of the ring in operative position within a groove of a piston disposed within a cylinder such as that employed in internal combustion engines.

In accordance with the present invention, the expander, which may also serve as the spacer, is so constructed that at least one peripheral edge thereof is uninterrupted save at the ends which abut. As shown in Figure 1, the spacer-expander 4 is of channel section having an upper flange 5, a lower flange 6, and a web 7 interconnecting the flanges 5 and 6. The spacer-expander 4 is identical with the construction shown in Figure 1 of Patent No. 2,486,359 and fully described therein, save that in accordance with the present invention, there is provided a series of tabs 8 extending upwardly at the inner periphery of upper flange 5, and a corresponding series of tabs 9 extending downwardly at the inner periphery of flange 6. The tabs 8 and 9 extend axially beyond their respective root flanges 5 and 6 for a distance slightly less than the thickness of the cylinder-engaging rails 1 and 2 used in connection therewith. As clearly shown in Figure 2, the rail 1 is seated on the upper surface of flange 5, with its inner periphery in engagement with tabs 8, while rail 2 is seated below flange 6 with its inner periphery in engagement with the tabs 9. With the construction shown, when a piston, provided with the piston ring assembly referred to, is inserted in a cylinder, the piston ring assembly is compressed to cylinder diameter against the resilience of spacer-expander 4, and when in position within the cylinder as shown in Figure 2, the edges of rails 1 and 2 engage the cylinder and are urged thereagainst by the resilience of flexible bridges 10 and 11 in flanges 5 and 6, respectively. When in operative position, the circumference of spacer-expander 4 is less than its circumference when free and unconfined, and consequently, it tends to resume its normal circumference. This tendency is transmitted through tabs 8 and 9 to the rails 1 and 2 as a radial thrust, urging the rails into firm engagement with the cylinder wall.

Figure 3:
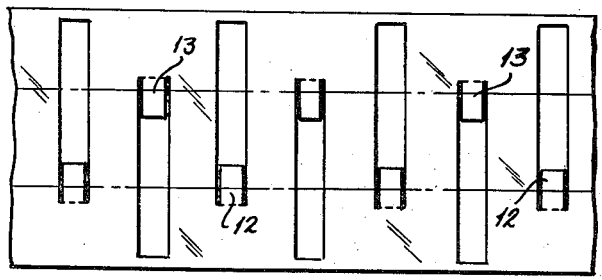
Figure 3 is a fragmentary plan view of a strip of material from which the expander element shown in Figure 1 may be made by appropriate folding.

The spacer-expander 4 may readily be formed from a strip of spring steel or the like in the manner described in the aforesaid patent with the addition, however, that tabs 8 and 9 must be formed in the process. Accordingly, the blank shown in Figure 3 herein is identical with that shown in Figure 5 of said patent. To provide for the formation of such tabs, a series of ears 12 are left integral with the portion of the blank which is to form flange 5, and a series of ears 13 are left integral with the portion of the blank which is to form flange 6, whereas in accordance with Patent No. 2,486,359, the material located at the position of ears 12 and 13 is removed in the slotting operation. The several ears 12 and 13 are, however, severed from the adjacent blank material on three sides so that they are left integral with the adjacent blank material only at the lower ends of ears 12 and at the upper ends of ears 13. The respective tabs 12 and 13 are turned at substantially right angles with the upper and lower zones (which are to form the flanges 6 and 5 respectively) of the blank, i. e., in the opposite direction from that in which the intermediate zone (which is to form web 7 of the completed ring) is turned.

Figure 4:
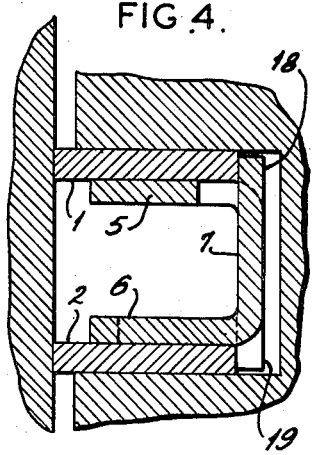
Figure 4 is a sectional view corresponding with Figure 2, but showing a further embodiment of the invention.
Figure 5:
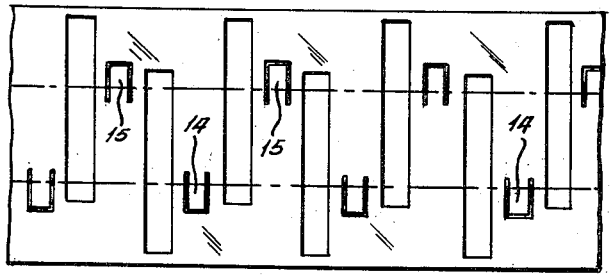
Figure 5 is a fragmentary plan view similar to Figure 3, but showing a strip of material from which the expander element shown in Figure 4 may be made.

Figures 4 and 5 illustrate a modified form of construction wherein the slotting of the blank is identical with that described in Patent No. 2,486,359, but tabs 14 and 15 are provided between the slots with the result shown in Figure 4 wherein tabs 18 and 19 extend axially from web 7 and the inner periphery of flanges 5 and 6, respectively, a hole being left adjacent the inner periphery of the flanges at the position originally occupied by the material which now constitutes tabs 18 and 19. In this embodiment, as in the previous embodiment, the tendency of spacer-expander 4 to increase in circumference creates a thrust which is transmitted radially to rails 1 and 2 through tabs 18 and 19.

A further embodiment of the invention is illustrated in Figures 6 through 9. In this embodiment, additional circumferential flexibility of the spacer-expander is provided by elongation of the flexible webs in the continuous edge of the spacer-expander, and the webs themselves are so bent as to provide abutments against which the cylinder-engaging rails may seat, and through which the radial thrust may be transmitted from the spacer-expander to the respective rails.

Figure 6:
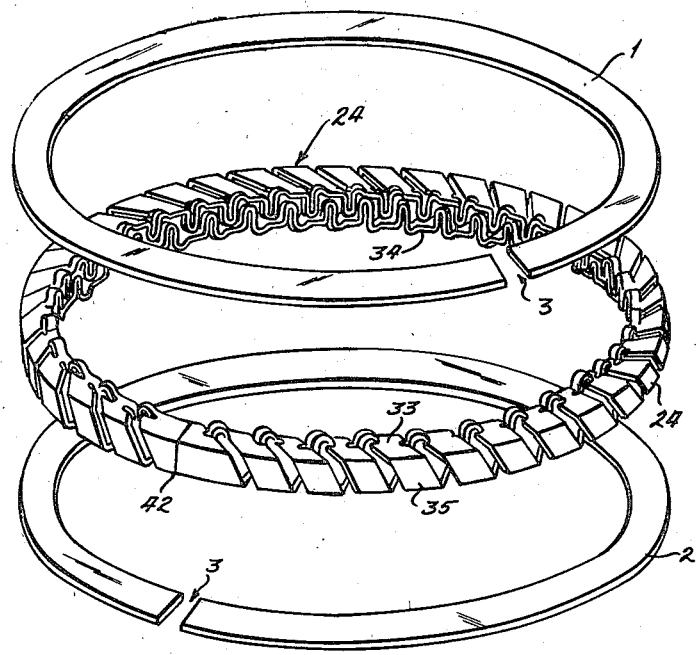
Figure 6 is an exploded perspective view of a piston ring assembly constructed in accordance with a further embodiment of the present invention.
Figure 7:
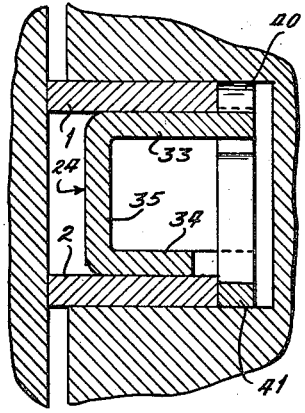
Figure 7 is a sectional view taken at a position corresponding to that of Figure 2, but showing the several components of the ring of Figure 6 in operative position within a groove of a piston disposed within a cylinder such as that employed in internal combustion engines.

In the embodiment shown in Figure 6, the continuous edge of the spacer-expander is located at its inner periphery, in contrast to the location of said continuous edge at the outer periphery of Figure 1.

As in the previous embodiment, the piston ring assembly consists of a pair of cylinder-engaging rails 1 and 2 associated with a spacer-expander 24 of the construction now to be described. The spacer-expander 24 is formed from a blank of appropriate length, but otherwise of the formation shown in Figure 8, which will be understood to be repeated throughout the length of the spacer-expander to be produced. The blank shown in Figure 8 consists of a strip 25 of spring steel, or other suitable material, having a thickness on the order of 0.020 inch. Throughout the length of such a strip, a series of cutouts 26 are formed. The cutouts are substantially I-shaped, and are preferably inclined with reference to the longitudinal axis of the blank 25, although they may be arranged perpendicularly. The advantage of the inclined relationship resides in the fact that the resultant flexible webs may be made longer than when the cutouts are perpendicular to the longitudinal axis of blank 25. The cutouts 26 terminate inwardly of the outer edges of blank 25 so as to leave between such outer edges and the nearest boundary of the cutouts 26 elongated sections 27 and 28. The intermediate sections of the cutout are defined by lips 29 and 30 which extend closer together than the lengths of the elongated strips 27 and 28. To form the respective elongated strips 27 and 28 into the flexible bridges to be later described, blank 25 is compressed longitudinally so as to bring lips 29 and 30 closer together as, for example, illustrated by the dotted lines designated 29' and 30' in Figure 8. In so doing, the elongated parts 27 and 28 are provided with S bends. Thereafter, the blank may be folded along longitudinal lines 31 and 32 to bring the parts of the blank above line 31 and below line 32 into substantial right angles with the zone of material between lines 31 and 32 to form a channel-shaped section.

Figure 9:
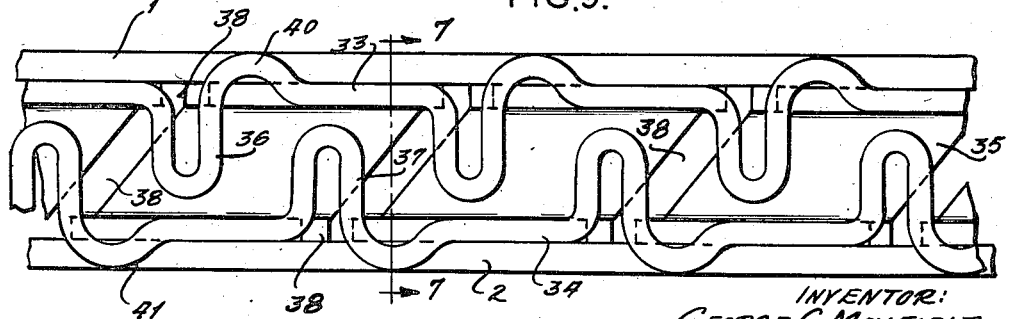
Figure 9 is an inside peripheral view of the piston ring assembly shown in Figures 6 and 7.

As viewed from the interior, the resultant ring is shown in Figure 9, and has an upper flange 33, a lower flange 34, and an interconnecting web 35. At the inner periphery of flanges 33 and 34, S folds 36 and 37 are formed of each elongated part 27 and 28, respectively, in the blank. The S folds 36 extend both upwardly from flange 33 and downwardly therefrom toward the opposite flange. In like manner, the S folds 37 extend downwardly from flange 34 and upwardly toward flange 33. Thus the S folds bridge the opposite ends of slots 38 (representing the distance between lips 29 and 30 when brought together in the positions designated 29' and 30') and provide a continuous edge at the inner periphery of each flange of the channel.

The portions 40 of S folds 36 which extend above flange 33 provide abutments against which the inner periphery of rail 1 may seat. Likewise, the portions 41 of the S folds 37 which extend below flange 34 provide abutments against which rail 2 may seat. The greater length provided in the flexible bridge across the ends of slots 38 by the arrangement just described provides for increased circumferential flexibility of the resultant structure. As shown in the drawings, the length of the S folds which constitute the flexible bridges is illustrated in extreme, but it will be understood that where a lesser degree of flexibility is desired, the S folds 36 and 37 (and the elongated parts 27 and 28 of the blank from which they are formed) may be appropriately foreshortened. In any event, the S folds are arranged so as to extend above flange 33 and below flange 34 for a distance somewhat less than the thickness of rails 1 and 2, but the desired additional length may be accommodated in the space between the flanges 33 and 34, as clearly shown in Figure 9. When the S folds do not exceed the length which could be accommodated in less than half the distance between flanges 33 and 34, the I-shaped cutouts 26 in blank 25 may be made in perpendicular relation to the longitudinal axis of the blank, or in other words, such cutouts need only be inclined when it is desired to offset the respective S folds as shown in Figure 9.

When the channel-shaped member has been produced from the blank, its ends are brought together in abutting relationship, as shown at 42 in Figure 6, and thereafter when it is desired to reduce the circumference of the ring, the application of appropriate forces flexes the S folds 36 and 37 (including 40 and 41) with the result that the edges defining slots 38 are brought closer together. The inherent resiliency of the material is, however, such as to cause the ring to resume its normal unconfined circumference, and such tendency results in the application of a radial thrust which is transmitted from member 24 through loops 40 and 41 to the inner periphery of rails 1 and 2 in the manner described in connection with the other embodiments.

Figure 8:
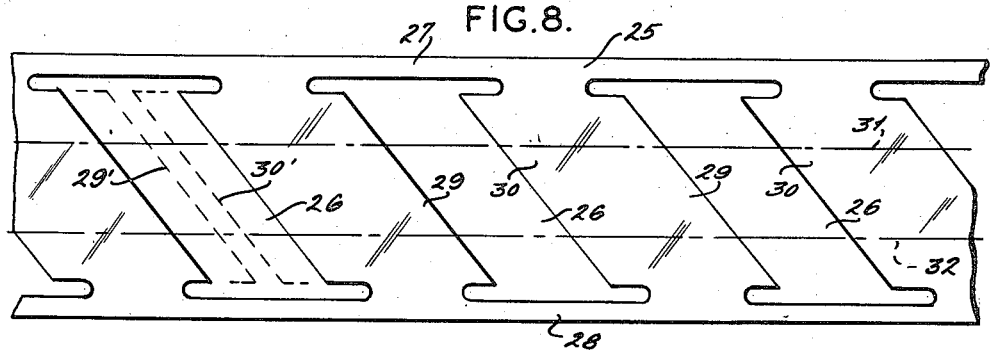
Figure 8 is a fragmentary plan view of a strip of material from which the expander element shown in Figure 6 may be made by appropriate folding.
Figure 10:
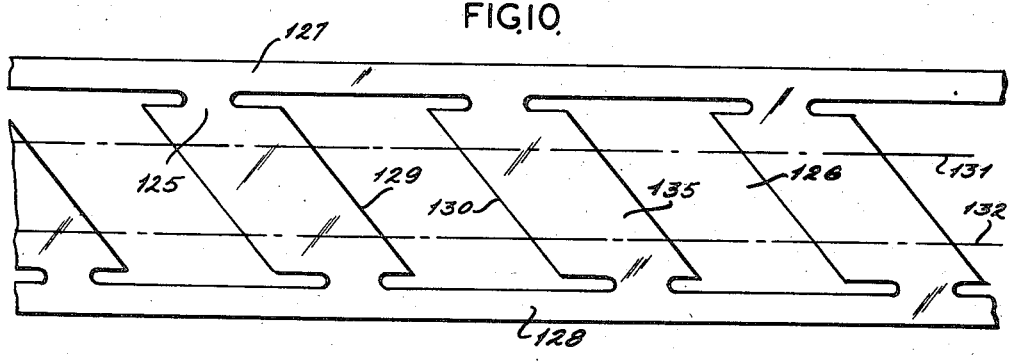
Figure 10 is a view corresponding to Figure 8 but showing the strip of material as cut out for a further embodiment.
Figure 11:
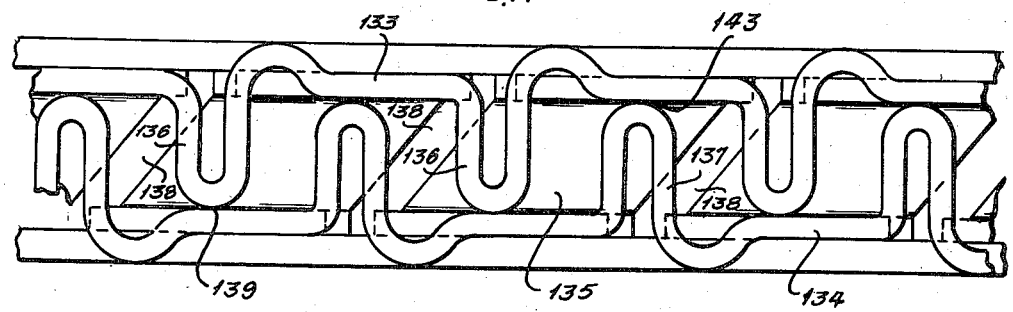
Figure 11 is an inside peripheral view of a piston ring assembly including a spacer-expander made from the blank shown in Figure 10.

In Figures 10 and 11, there is shown a modified form of the blank shown in Figure 8 and of the ring assembly shown in Figure 9—the several parts generally corresponding except in particulars to be hereinafter pointed out, and the parts of Figures 10 and 11 being denoted by reference characters in the one hundred series, the last two digits of which denoted similar parts of Figures 8 and 9. In Figure 10, the elongate sections 127 and 128 are made longer and wider than sections 27 and 28 in Figure 8, and consequently the dimension of cutouts 126 are greater in the lengthwise dimension of the blank and lesser in the widthwise dimension of the blank than in Figure 8. The additional length of sections 127 and 128 provides sufficient material to enable the folds 136 and 137 to extend, in the axial direction of the ring, entirely across the interior thereof as shown in Figure 11, while the added width of sections 127 and 128 increases the radial dimension of the fold in the finished ring. At their crests 139, folds 136 engage the interior of flange 134, and at their crests 143, folds 137 engage the interior of flange 133, thereby providing a series of spacer elements adjacent the free edges of the flanges. Hence, if the interconnecting webs 135 should wear through or otherwise become weakened, the several folds 136 and 137 are so disposed as to maintain the flanges 133 and 134 in proper spaced relationship.

Figure 12:
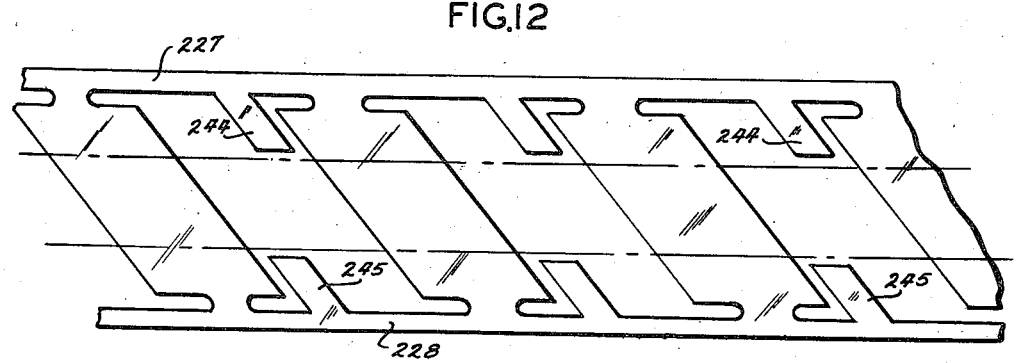
Figure 12 is a view corresponding with Figure 10 but showing a blank for another embodiment.

The additional width of elongate sections 127 and 128 provides an increased bearing area at crests 139 and 143, and also stiffens the ring element against circumferential contraction. The stiffening feature may be omitted if desired by cutting the blank as shown in Figure 12 where the several parts are denoted by reference numerals in the two hundred series, whose last two digits correspond with those used in Figures 8 and 10. In Figure 12, the elongate sections 227 and 228 are of the same length as shown in Figure 10, but of the same width as shown in Figure 8. In the Figure 12 embodiment, however, the sections 227 and 228 are provided with integral extensions 244 and 245, respectively. These extensions are so positioned lengthwise of sections 227 and 228 that, when the latter are folded as shown in Figure 11, the extensions 244 and 245 lie at the crests of the folds and hence provide the desired bearing surface against the flange opposite that in which the folds are rooted.

The feature of so folding the peripheral sections, which bridge the ends of the slots at the free edges of the flanges, that the folds serve as spacers between the flanges may in like manner be utilized in rings where the free edges constitute the exterior periphery of the channel-shaped ring element such as that shown in Figure 1; and indeed may be utilized where channel-shaped ring elements are employed as cylinder-engaging rings with or without adjacent wafer rings or rails.

While the invention has been described with reference to piston ring assemblies which are provided with two cylinder-engaging rails, those skilled in the art will understand that more than one rail may be provided on each side of the spacer-expander, and the thrust transmitting abutments appropriately extended so as to engage as many of the rails as it is desired to urge outwardly. On the other hand, but one such cylinder-engaging rail may at times be deemed desirable for use in connection with the spacer-expander of the present invention. In such situations, the flange of the spacer-expander opposite the flange upon which the cylinder-engaging rail is seated may be extended radially so as to make direct contact with the cylinder wall. Moreover, where there is no necessity for a spacer, one flange and the web of the channel-shaped member may be dispersed with, leaving only one flange which, having a continuous edge, will continue to serve as an expander for a rail seated against the abutments thereon; and if it is desired that such a single flange be utilized as an expander for rails both above and below the same, the tabs may be turned in opposite directions from a single flange.

While in the foregoing description, the means for transmitting the radial thrust from the spacer-expander to the respective rails has been described as an integral part of the spacer-expander, it will be understood that the equivalent result may be accomplished by providing appropriate tabs extending from the rails and engaging an appropriate hole or edge in the spacer-expander, or suitable dowels may be provided between the rails and the expander, provided their connection with one or the other of the members is sufficiently loose to permit some relative movement.

From the foregoing description, those skilled in the art should readily understand the structure and mode of operation of the piston ring assemblies referred to, and should realize that the invention accomplishes its objects. While several embodiments of the invention have been described in detail and certain modifications and variations thereof indicated, it is not to be understood that the invention is limited to the details of the foregoing disclosure, but on the contrary, it is realized that various modifications and adaptations of the invention will present themselves to those skilled in the art without departing from the spirit of the invention, and accordingly, it is to be understood that such modifications and variations are contemplated by and within the scope of the appended claims.

Having thus described the invention, what is claimed and desired to be secured by Letters Patent is:

1. A piston ring comprising a pair of cylinder-engaging rails and a channel, said channel being disposed between said rails and having edges continuous from end to end of the ring, the ends of the channel abutting when in operation, incisions in the channel extending from near one edge toward and across the bottom of the channel and therebeyond toward the other edge, said incisions terminating short of both edges, thereby forming a series of circumferentially flexible webs at the peripheral edges of the ring, and substantially circumferentially spaced tabs adjacent the inner periphery of said channel for transmitting radial thrust from said channel to said rails.

2. A piston ring comprising a cylinder-engaging rail and a channel, said channel having opposite flanges and a web interconnecting the flanges, at least one of said flanges having an edge continuous from end to end of the ring, incisions in the channel extending from within one flange through the web and into the other flange but terminating short of said continuous edge to provide circumferentially flexible bridges thereat, said bridges being bowed out of alignment with said flanges, and substantially circumferentially spaced means adjacent the inner periphery of said channel for transmitting radial thrust from said channel to said rail.

3. A piston ring comprising a cylinder-engaging rail and an expander therefor, said expander consisting of a strip of spring material formed into an annulus with its thin dimension extending in the axial dimension, said strip having a series of slots extending radially therethrough but terminating short of one edge thereof, circumferentially flexible bridges at said edge adjacent the ends of at least some of said slots, said bridges being bowed in the axial direction of said annulus, the ends of said annulus abutting when in operative position, and means for transmitting radial thrust from said expander to said rail.

4. In a piston ring of the character having a pair of cylinder-engaging rails maintained in axially spaced relation by a channel having opposite flanges and an intervening web, the improvement which comprises, the web of said channel having a series of circumferentially spaced slots extending into said flanges toward but terminating short of the free edges thereof, the free edges of said flanges being continuous from end to end thereof and said flanges having circumferentially flexible bridges forming a part of the continuous free edge, said circumferentially flexible bridges being located at the peripheral ends of said slots, the ends of said channel abutting when in operation, and a series of circumferentially spaced parts projecting above and below said flanges respectively for transmitting radial thrust from said channel to said rails, said parts each extending circumferentially for a distance not substantially greater than the circumferential dimension of said slots.

5. The piston ring of claim 4 wherein said circumferential bridges are reentrantly curved and extend axially above and below their related flanges.

6. The piston ring of claim 4 wherein said circumferential bridges are looped in the space between the flanges.

7. The piston ring of claim 4 wherein said circumferential bridges are looped in the space between the flanges, and the crests of the loops are disposed adjacent the flange opposite that in which the loops are rooted.

8. The piston ring of claim 4 wherein said circumferential bridges are looped in the space between the flanges and the loops from the upper and lower flanges are circumferentially spaced.

9. A piston ring element of the non-bottoming type comprising, a channel having opposite flanges and an intervening web, the web of said channel having a series of circumferentially spaced slots extending into said flanges toward but terminating short of the free edges thereof, the free edges of said flanges being continuous from end to end thereof and said flanges having circumferentially flexible bridges forming part of the continuous free edge, said circumferential bridges being located at the peripheral ends of said slots, and the bridges in one flange being looped in the space between the flanges and disposed adjacent the opposite flange.

10. The method of making piston rings of the non-bottoming type which comprises, providing a strip of resilient material, cutting sections from said strip at spaced intervals lengthwise thereof, said cut sections terminating inwardly of both opposite margins of said strip so as to leave a narrow band of said material between each cut section and the adjacent margins, contracting the cutout strip longitudinally by bending said bands out of the plane of said strip to form loops, and then forming the contracted strip into an annulus with its ends abutting.

11. The method of claim 9 wherein the contracted strip is folded along lines substantially parallel with the longitudinal axis of said strip to form a channel.

12. The method of claim 9 wherein the marginal bands adjacent each cut section are in spaced relation longitudinally of the strip.

References Cited in the file of this patent

UNITED STATES PATENTS

| | | |
|---|---|---|
| 2,290,321 | Engelhardt | July 21, 1942 |
| 2,421,175 | Zahodiakin | May 27, 1947 |
| 2,486,359 | Mayfield | Oct. 25, 1949 |
| 2,635,022 | Shirk | Apr. 14, 1953 |